(12) United States Patent
Yasuda et al.

(10) Patent No.: US 10,969,019 B2
(45) Date of Patent: Apr. 6, 2021

(54) FLUID CONTROL DEVICE, RECORDING MEDIUM RECORDED WITH CONTROL PROGRAM, AND CONTROL METHOD

(71) Applicant: HORIBA STEC, Co., Ltd., Kyoto (JP)

(72) Inventors: Tadahiro Yasuda, Irvine, CA (US); Thomas Hoke, Irvine, CA (US); Ryan Owens, Irvine, CA (US); Maximilian Gundlach, Irvine, CA (US); Patrick Lowery, Irvine, CA (US); John Dick, Irvine, CA (US); Tomohiro Yoshida, Irvine, CA (US)

(73) Assignee: HORIBA STEC, Co., Ltd., Kyoto (JP)

( * ) Notice: Subject to any disclaimer, the term of this patent is extended or adjusted under 35 U.S.C. 154(b) by 95 days.

(21) Appl. No.: 16/001,890

(22) Filed: Jun. 6, 2018

(65) Prior Publication Data
US 2018/0356845 A1 Dec. 13, 2018

(30) Foreign Application Priority Data
Jun. 7, 2017 (JP) .............................. JP2017-112705

(51) Int. Cl.
*F16K 1/54* (2006.01)
*F16K 31/00* (2006.01)
*G05D 7/06* (2006.01)

(52) U.S. Cl.
CPC .............. *F16K 1/54* (2013.01); *F16K 31/004* (2013.01); *G05D 7/0635* (2013.01)

(58) Field of Classification Search
CPC ........ F16K 1/54; F16K 31/004; G05D 7/0635
See application file for complete search history.

(56) References Cited

U.S. PATENT DOCUMENTS

| | | | | |
|---|---|---|---|---|
| 4,726,389 A | * | 2/1988 | Minoura ............. | F02D 41/2096 137/1 |
| 6,012,437 A | * | 1/2000 | Radhamohan .......... | F02D 21/08 123/568.23 |
| 6,056,000 A | * | 5/2000 | Santacatterina .... | F16K 31/0675 137/1 |
| 8,505,872 B2 | * | 8/2013 | Kawamura ............. | F16K 31/04 123/568.19 |

FOREIGN PATENT DOCUMENTS

JP        2015143534 A        8/2015

* cited by examiner

*Primary Examiner* — Eric Keasel
(74) *Attorney, Agent, or Firm* — Alleman Hall Creasman & Tuttle LLP

(57) ABSTRACT

Provided is a fluid control device that achieves high sealing performance at full closure, and can suppress damage to a valve body or a valve seat surface even without mechanical accuracy improvements. The fluid control device includes: a fluid control valve provided in a flow path through which fluid flows: and a control mechanism that controls the fluid control valve. The fluid control valve includes: a valve seat surface; a valve body that contacts and separates from the valve seat surface; and an actuator that drives the valve body. Further, the control mechanism includes a speed adjustment part that when the valve body is brought close to the valve seat surface in order to fully close the fluid control valve, and the valve seat surface and the valve body reach a predetermined distance apart, reduces the moving speed of the valve body more than before reaching the predetermined distance.

10 Claims, 12 Drawing Sheets

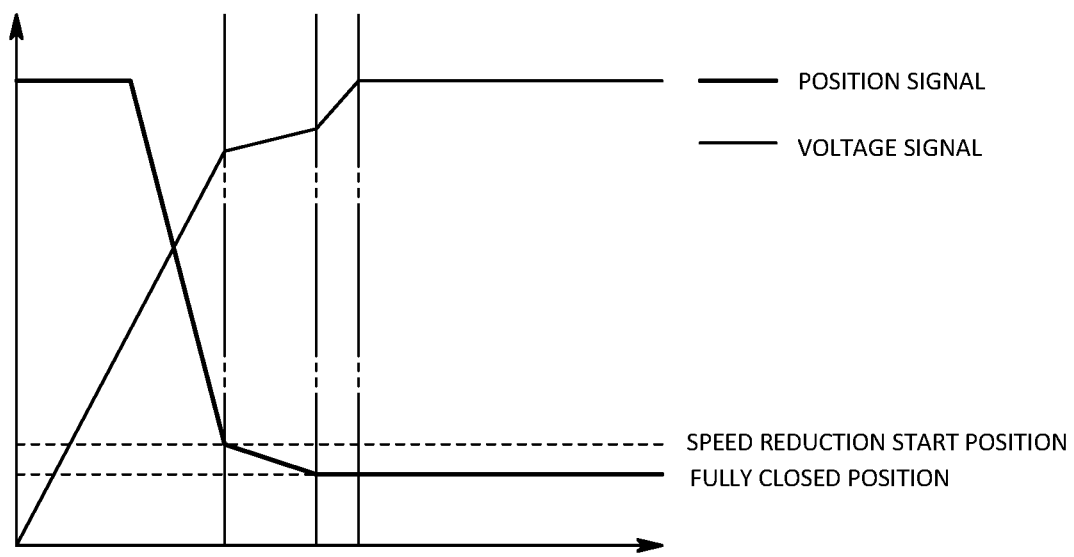
FIG. 10 (a) NORMALLY OPENED CASE
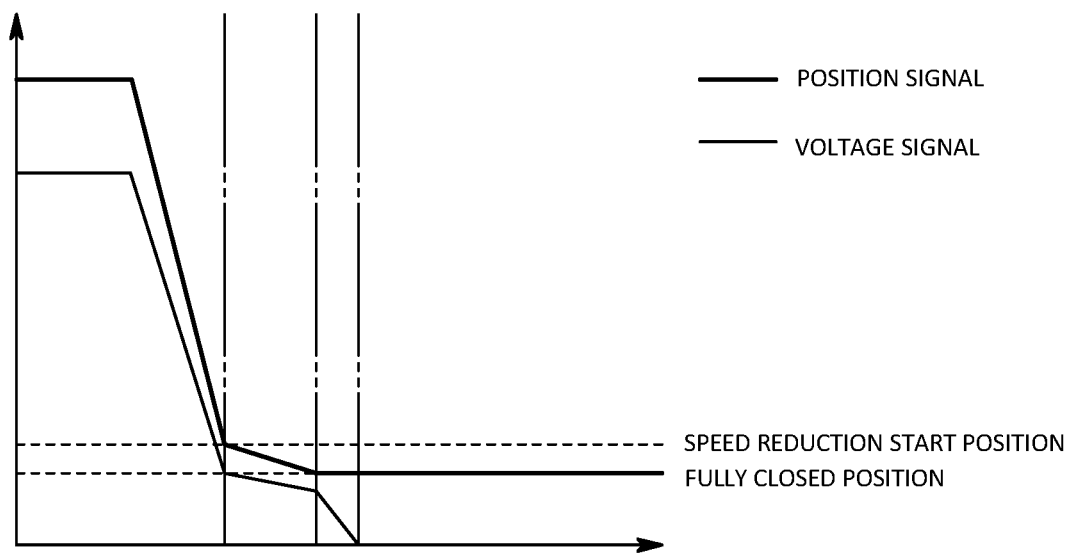
FIG. 10 (b) NORMALLY CLOSED CASE

FLUID CONTROL DEVICE, RECORDING MEDIUM RECORDED WITH CONTROL PROGRAM, AND CONTROL METHOD

TECHNICAL FIELD

The present invention relates to a fluid control device used to control the flow rate or pressure of fluid.

BACKGROUND ART

In a fluid control device such as a mass flow controller, the opening level of a fluid control valve is feedback-controlled on the basis of the deviation between a setting flow rate set by a user and an actual flow rate measured by a flow rate sensor so that fluid flows at the setting flow rate.

In addition, a mass flow controller is required not only to keep a state where fluid keeps flowing at a setting flow rate, but also to be able to prevent the fluid from flowing toward the downstream side of the mass flow controller.

For example, fluid control valves used for a mass flow controller of a normally closed type include one configured such that, when a fully closing command is received, a valve body is pressed against a valve seat surface with predetermined pressing force by a spring (see Patent Literature 1).

Further, in order to make it possible to achieve higher sealing performance than the above-described fluid control valve, there is also one adapted to arrange a valve body above a valve seat surface and drive an actuator so as to, from a state where the valve body is in contact with the valve seat surface, further push the valve body against the valve seat surface side.

Meanwhile, when a fluid control valve configured to be able to achieve high sealing performance at the time of full closure continues to repeat the full closure and opening, the strong pressing force of the valve may cause, for example, the surface of a valve body to be damaged by a valve seat surface, thus reducing the sealing performance.

This may be because, for example, the valve body slightly tilts from a design attitude and only part of the valve body is strongly pressed against the valve seat surface.

However, the parallel accuracy of a valve body is currently reaching its limit, and therefore it is difficult to prevent a reduction in sealing performance due to secular change by improving the tilt of a valve body.

CITATION LIST

Patent Literature

Patent Literature 1: Japanese Unexamined Patent Publication JP-A 2015-143534

SUMMARY OF INVENTION

Technical Problem

The present invention is made in consideration of the above-described problem, and intends to provide a fluid control device that while achieving high sealing performance at the time of full closure, can suppress the damage to a valve body or a valve seat surface even without more improving mechanical accuracy than current one.

Solution to Problem

That is, the fluid control device according to the present invention includes: a fluid control valve provided in a flow path through which fluid flows: and a control mechanism adapted to control the fluid control valve. Also, the fluid control valve includes: a valve seat surface; a valve body adapted to contact with and separate from the valve seat surface; and an actuator adapted to drive the valve body. Further, the control mechanism includes a speed adjustment part that when the valve body is brought close to the valve seat surface in order to fully close the fluid control valve, and the distance between the valve seat surface and the valve body reaches a predetermined distance, more reduces the moving speed of the valve body than before reaching the predetermined distance. Note that "full closure (to fully close)" refers to a concept including not only a state where the flow rate of the fluid flowing through the flow path is zero but a state where after the valve body has contacted with the valve seat surface, the valve body is further pushed against the valve seat surface side.

In such a configuration, since when the distance between the valve seat surface and the valve body reaches the predetermined distance in the course of the full closure, the moving speed of the valve body is more reduced than before reaching the predetermined distance, an impact load generated between the valve seat surface and the valve body can be reduced to suppress damage from occurring or developing. Accordingly, the damage to the valve body or the valve seat surface due to secular change can be more reduced than before to keep high sealing performance at the time of the full closure.

Also, the damage can be reduced by controlling the valve body, and therefore it is not necessary to more improve the mechanical accuracy of the fluid control valve than current one.

In order to make it possible to move the valve body at high speed just until just before the full closure and increase a response speed to a fully closing command, as well as to make it possible to sufficiently reduce impact at the time of contact, it is only necessary that the fluid control valve further includes a displacement sensor adapted to detect the distance between the valve seat surface and the valve body, and the speed adjustment part is configured to, when the distance detected by the displacement sensor is equal to or less than the predetermined distance, more reduce the moving speed of the valve body than when the distance detected by the displacement sensor is larger than the predetermined distance.

In order to enhance the sealing performance by further bringing the valve body into close contact with the valve seat surface from a state where the valve body is in contact with the valve seat surface, it is only necessary that the control mechanism further includes a voltage control part adapted to output a digital voltage command signal for controlling voltage to be applied to the actuator, and when the distance detected by the displacement sensor reaches zero, the voltage control part outputs the voltage command signal so as to further move the valve body toward a valve seat surface side.

As a specific configuration example for reducing the moving speed of the valve body just before the full closure, a configuration in which the control mechanism further includes a D/A converter adapted to output analog voltage corresponding to the voltage command signal, and when the distance detected by the displacement sensor is equal to or less than the predetermined distance, the speed adjustment part changes a setting coefficient for the D/A converter so as to more reduce the moving speed of the valve body than when the distance detected by the displacement sensor is larger than the predetermined distance can be cited.

For example, in order to make it possible to reduce the moving speed of the valve body just before the full closure even when, when moving the position of the valve body so as to contact with the valve seat surface, no voltage is applied to the actuator, it is only necessary that the actuator is a piezo actuator, and when the distance detected by the displacement sensor is equal to or less than the predetermined distance, the speed adjustment part changes the setting coefficient for the D/A converter so as to more reduce a discharge speed of the piezo actuator than when the distance detected by the displacement sensor is larger than the predetermined distance.

As a specific configuration adapted to further enhance the sealing performance at the time of the full closure when using the piezo actuator, a configuration in which when positive voltage is applied to the piezo actuator, the valve body moves in a direction to separate from the valve seat surface, and in a state where no voltage is applied to the piezo actuator, is in contact with the valve seat surface, and when the distance detected by the displacement sensor reaches zero, the voltage control part outputs the voltage command signal so as to apply negative voltage to the piezo actuator can be cited.

Even when the attitude of the valve body tilts in a state before the valve body contacts with the valve seat surface, in order to return the attitude to a design attitude before the contact and prevent only part of the valve body from being strongly pressed, it is only necessary that the valve seat surface is formed surrounding an inflow opening through which the fluid flows in, and the valve body includes: a closing surface adapted to contact with the valve seat surface to close the inflow opening; and a peripheral surface formed flush with an outer side of the closing surface, and the fluid control device further includes an aligner of which at least a part is formed in a same plane as the valve seat surface on the outer side of the closing surface.

Even when the fluid control valve is of a normally opened type, in order to make it possible to prevent the valve body from being damaged by reducing the moving speed just before the valve body contacts with the valve seat surface and thereby preventing a large impact force from occurring, it is only necessary that the actuator is a piezo actuator, and when the distance detected by the displacement sensor is equal to or less than the predetermined distance, the speed adjustment part changes the setting coefficient for the D/A converter so as to more reduce a voltage increase rate of the piezo actuator than when the distance detected by the displacement sensor is larger than the predetermined distance.

Even when the relationship between a value indicated by a position signal outputted by the displacement sensor and a fully closed position or a speed reduction start position is changed due to secular change or the like, in order to make it possible to always reduce the moving speed of the valve body at a position separated from the fully closed position by a predetermined distance, it is only necessary that the speed adjustment part stores the speed reduction start position of starting to reduce the moving speed of the valve body, and is configured to reduce the moving speed of the valve body when a position detected by a displacement sensor reaches the speed reduction start position, and the fluid control device further includes a position update part adapted to update the speed reduction start position on the basis of a position signal outputted from the displacement sensor in a fully closed state.

In order to make it possible to suppress the damage to the valve body due to the repetition of the full closure and opening only by updating a program in an existing fluid control device, it is only necessary to use a control program that is used for a fluid control device including: a fluid control valve provided in a flow path through which fluid flows: and a control mechanism adapted to control the fluid control valve, in which the fluid control valve includes: a valve seat surface; a valve body adapted to contact with and separate from the valve seat surface; and an actuator adapted to drive the valve body, and that instructs the control mechanism including a computer to fulfill a function as a speed adjustment part that when the valve body is brought close to the valve seat surface in order to fully close the fluid control valve, and a distance between the valve seat surface and the valve body reaches a predetermined distance, more reduces a moving speed of the valve body than before reaching the predetermined distance. Note that the control program may be one electronically delivered or recorded in a recording medium such as a CD, DVD, HD, SSD, or flash memory.

In order to make it possible to reduce the damage to the valve body doe to the repetition of the fully closing and opening operation, it is only necessary to use a control method that is for a fluid control device including: a fluid control valve provided in a flow path through which fluid flows: and a control mechanism adapted to control the fluid control valve, in which the fluid control valve includes: a valve seat surface; a valve body adapted to contact with and separate from the valve seat surface; and an actuator adapted to drive the valve body, and that when the valve body is brought close to the valve seat surface in order to fully close the fluid control valve, and the distance between the valve seat surface and the valve body reaches a predetermined distance, more reduces the moving speed of the valve body than before reaching the predetermined distance.

Advantageous Effects of Invention

Since the fluid control device according to the present invention is configured to reduce the moving speed of the valve body just before the valve body contacts with the valve seat surface in the course of full closure as described above, impact on the valve body can be reduced to suppress damage from occurring. Accordingly, even when repeating the full closure with the valve body pressed against the valve seat surface with strong pressing force in order to exert high sealing performance and opening, high sealing performance can be kept over a long period of time without causing damage resulting in a reduction in sealing performance.

BRIEF DESCRIPTION OF DRAWINGS

FIGS. 10(a) and 10(b) are schematic graphs illustrating changes in position signal and voltage signal in a fully closing operation state in the third embodiment;

DESCRIPTION OF EMBODIMENTS

A first embodiment of the fluid control device according to the present invention will be described with reference to FIGS. 1 to 5.

A fluid control device of the first embodiment is a mass flow controller 100 used to control the flow rate of fluid flowing through a flow path. For example, in a flow path structure including one main flow path and multiple branch flow paths branched on the downstream side of the main flow path, the mass flow controller 100 constitutes part of a flow rate control system adapted to control a ratio in flow rate between or among the branch flow paths. More specifically, the flow rate ratio control system achieves a predetermined ratio between or among the flow rates of the fluid flowing through the respective flow paths in such a way that mass flow controllers 100 are provided in the respective branch flow paths one by one and respective mass flow controllers 100 other than a mass flow controller 100 provided in one branch flow path control the flow rates of the fluid flowing through corresponding branch flow paths. Also, the mass flow controllers 100 provided in the respective branch flow paths are configured to be capable of fully closing operation so as to prevent the fluid from flowing toward downstream sides in corresponding branch flow paths.

Figure 1:
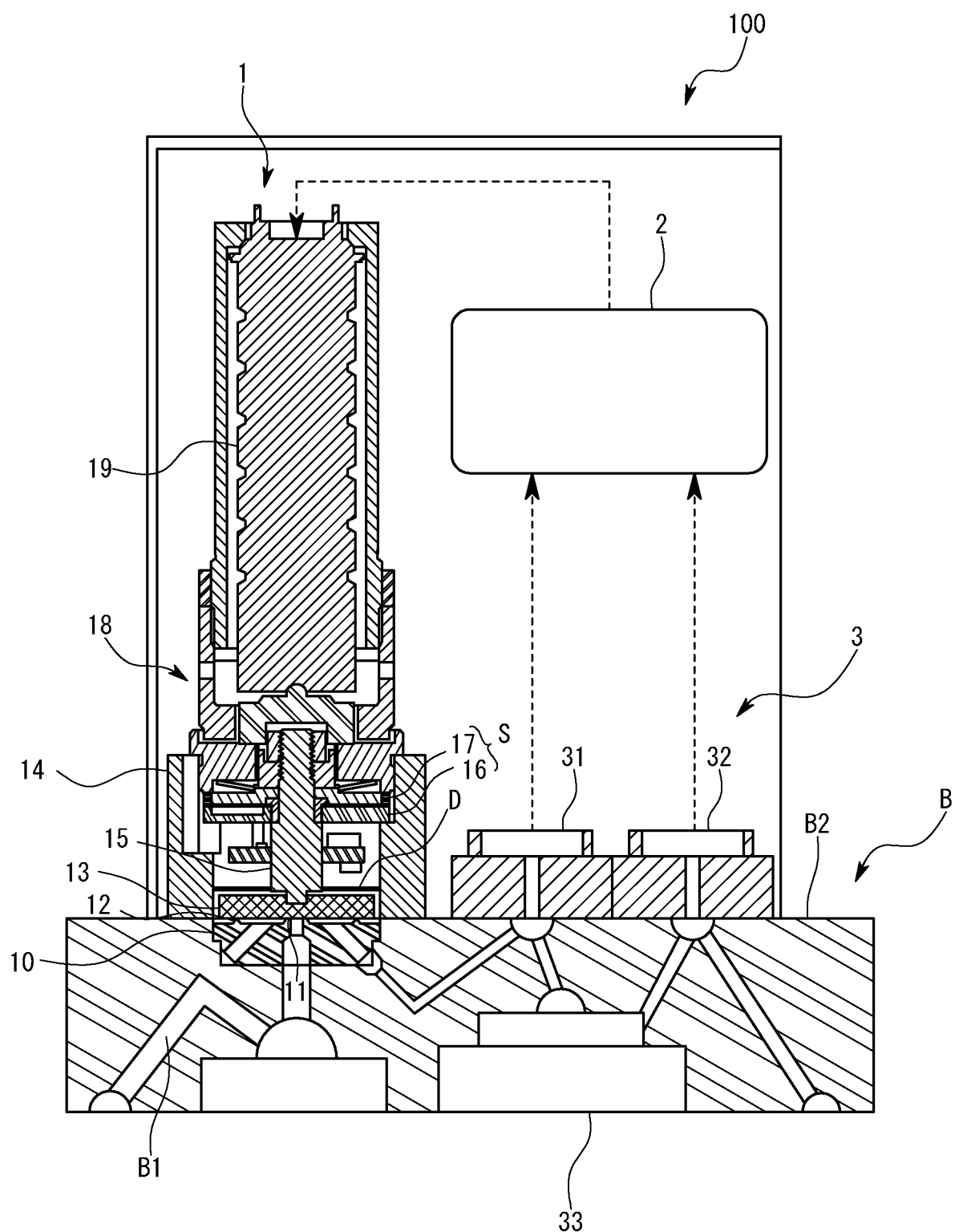
FIG. 1 is a schematic cross-sectional view illustrating a fluid control device according to a first embodiment of the present invention.

As illustrated in FIG. 1, the mass flow controller 100 is one including: a substantially rectangular parallelepiped block B, which is formed with an internal flow path B1 and whose upper surface is formed with a part attachment surface B2; a fluid control valve 1 attached on the part attachment surface B2; a flow rate sensor 3 adapted to measure the flow rate of the fluid flowing through the internal flow path B1; and a control mechanism 2 adapted to control the opening level of the fluid control valve 1 on the basis of an output from the flow rate sensor 3.

The flow rate sensor 3 is a pressure type sensor provided on the downstream side of the fluid control valve 1, and includes: first and second pressure sensors 31 and 32 respectively provided on the upstream and downstream sides of a laminar flow element 33; and a flow rate calculation part (not illustrated) adapted to calculate the flow rate on the basis of the outputs of the first and second pressure sensors 31 and 32. The first pressure sensor 31 and the second pressure sensor 32 are attached on the part attachment surface B2 of the block B, lined up in a row together with the fluid control valve 1. Also, the flow rate calculation part is configured using a calculation function of the control mechanism 2.

Figure 2:
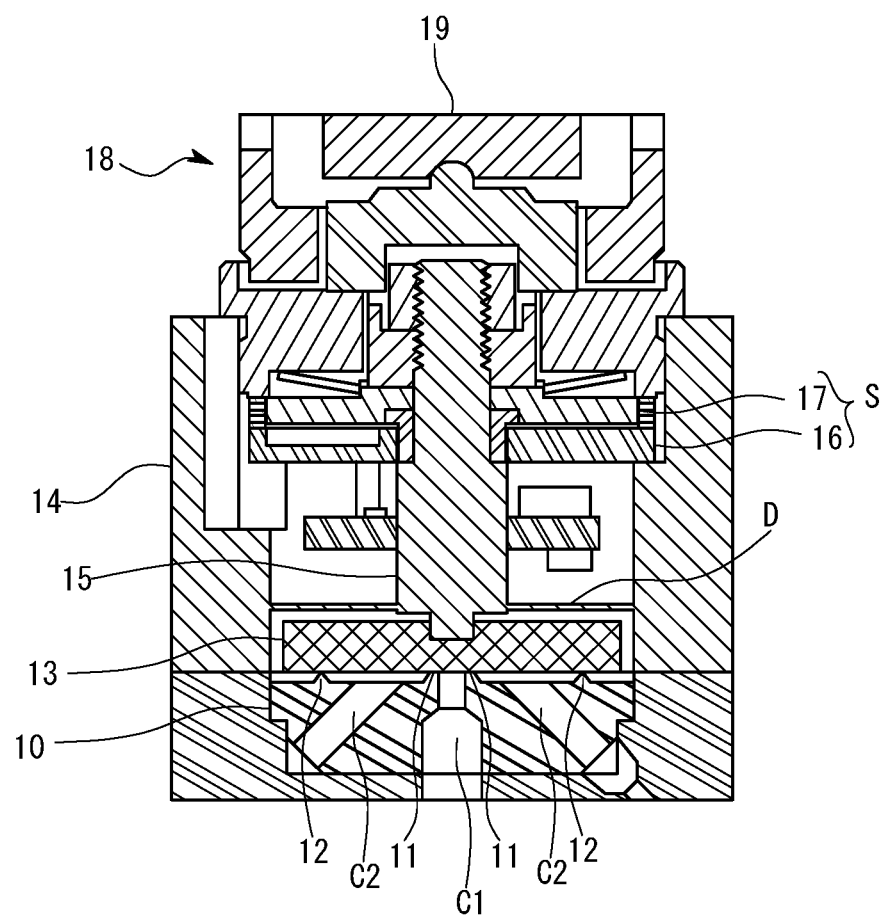
FIG. 2 is a schematic enlarged view of a valve seat block and a valve body part of a fluid control valve in the first embodiment.

The fluid control valve 1 is one that as illustrated in FIGS. 1 and 2, includes: a valve seat block 10 contained in a containing concave part that divides the internal flow path B1 formed in the block B; a valve body 13 that is arranged facing the upper side of the valve seat block 10 and adapted to contact with and separate from a valve seat surface 11 formed on the upper surface side of the valve seat block 10; a displacement sensor S that detects the distance between the valve seat surface 11 and the valve body 13; and an actuator that exerts a driving force on the valve body 13.

The valve seat block 10 is one that includes an in-valve inflow path C1 extending in the top-bottom direction in FIG. 1, and two in-valve outflow paths C2 extending obliquely downward. The in-valve inflow path C1 is connected to the upstream side of the internal flow path B1 of the block B, into which the fluid flows. The fluid passing through the in-valve inflow path C1 passes between the upper surface side of the valve seat block 10 and the valve body 13 and flows into the in-valve outflow paths C2. The downstream sides of the in-valve outflow paths C2 are connected to the downstream side of the internal flow path B1 of the block B, and the fluid passing through the in-valve outflow paths C2 subsequently flows into the first pressure sensor 31.

In addition, around an opening on the upper surface side of the in-valve inflow path C1, the valve seat surface 11 of an annular shape is formed. Further, on the upper surface side of the valve seat block 10, an aligner 12 that is a protruded rim having an annular ridge is formed surrounding the valve seat surface 11 on the outer side of the valve seat surface 11. The ridge of the aligner 12 is arranged substantially flush with the valve seat surface 11 in a state where the block B is upright.

The valve body 13 is a substantially disc-shaped one, and includes: a closing surface that in a fully closed state, contacts with the valve seat surface 11 to close the opening of the in-valve inflow path C1; and a peripheral surface that is an outer part of the closing surface and contacts with the ridge of the aligner 12. Ideally, the valve body 13 moves in a direction to contact with or separate from the valve seat surface 11 while keeping parallel to the valve seat surface 11. However, the valve body 13 is configured to, even when tilting, naturally bring the attitude thereof into a horizontal state in such a way that a part of the peripheral surface tilting downward contacts with the ridge of the aligner 12 at the time of the full closure, and the valve body 13 is further pressed downward. The valve body 13 is also configured to be connected to the actuator via a shaft 15 extending in a direction vertical to a diaphragm D and thereby raised upward. More specifically, in a natural state where the actuator is not driven, the lower surface of the valve body 13 contacts with the valve seat surface 11 to fully close the opening. In this way, the fluid control valve 1 is configured as a normally closed type that is constantly closed even in the state where no voltage is supplied to the actuator.

On the upper side than the valve body 13, a tubular housing 14 is attached surrounding the containing concave part. Inside the housing 14, the displacement sensor S is contained, and the housing 14 is configured to allow the diaphragm D formed on the lower end surface part of the housing 14 to prevent the fluid from entering inside. Also, in the central part inside the housing 14, the shaft 15 extending in the direction vertical to the diaphragm D is provided, and the shaft 15 connects between the valve body 13 and the actuator. That is, it is adapted to drive the actuator to thereby raise the shaft 15 upward, and consequently separate the valve body 13 from the valve seat surface 11.

The displacement sensor S is configured to include: a sensor plate 16 fixed pressed against the side surface inside the housing 14; and a metallic target 17 provided facing the sensor plate 16. The displacement sensor S is one of, for example, an eddy current type or a capacitance type, and generates an output depending on the separation distance between the sensor plate 16 and the target 17. The target 17 is configured to move in the top-bottom direction while interlocking with the movement of the shaft 15, and therefore the displacement amount of the target 17 is the same as the movement amount of the valve body 13. Accordingly, the displacement sensor S can detect the position of the valve body 13 with respect to the valve seat surface 11, or the opening level.

The actuator is a piezo actuator 19 in the first embodiment, and a displacement inverting mechanism 18 provided between the piezo actuator 19 and the upper end part of the shaft 15 is adapted to, when the piezo actuator 19 is applied with positive voltage and extends, raise the shaft 15 upward to separate the valve body 13 from the valve seat surface 11. On the other hand, when the piezo actuator 19 contracts, the shaft 15 moves downward and the valve body 13 moves toward the valve seat surface 11 side.

Figure 3:
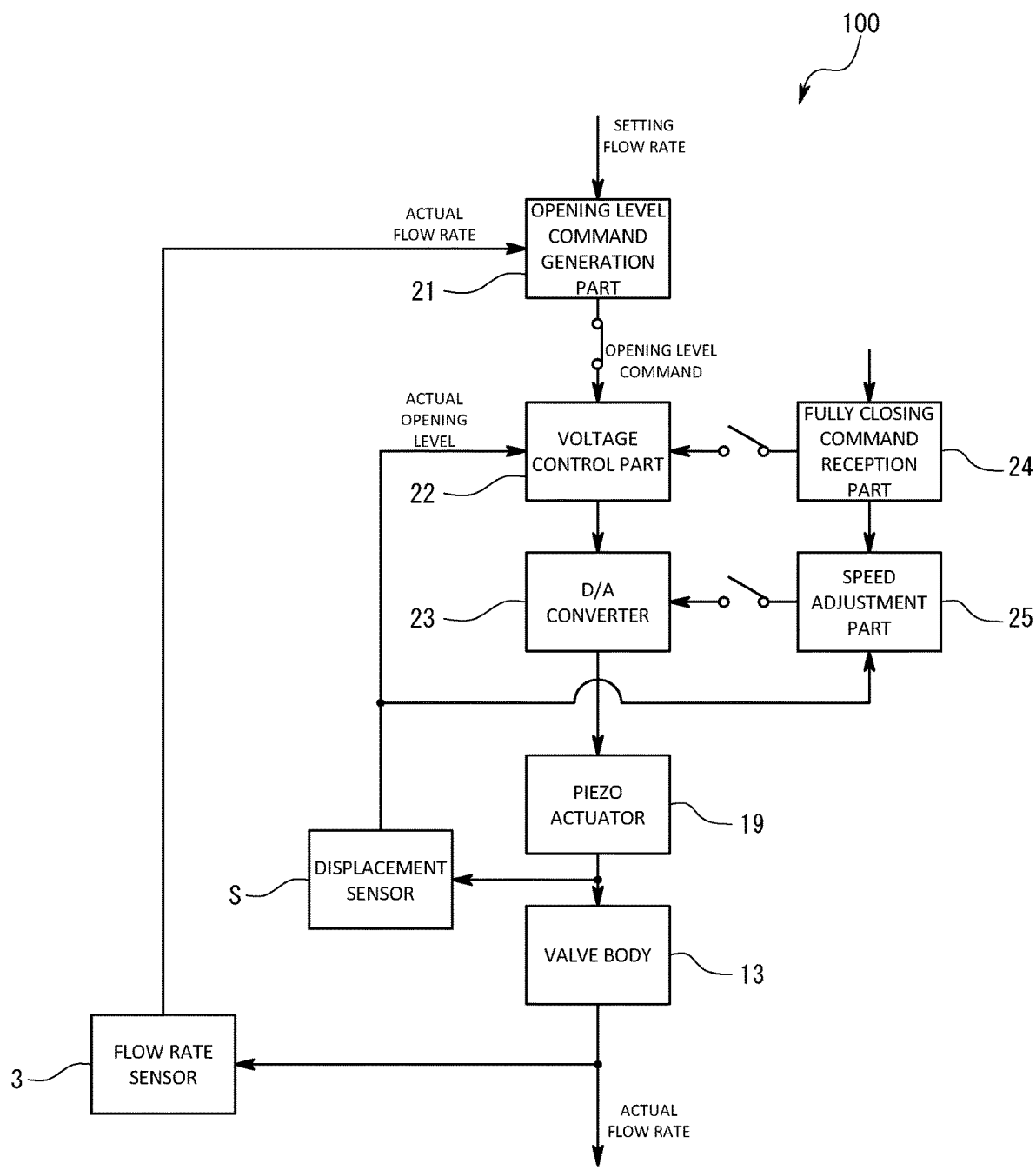
FIG. 3 is a functional block diagram illustrating a state where the fluid control device in the first embodiment performs flow rate control.
Figure 4:
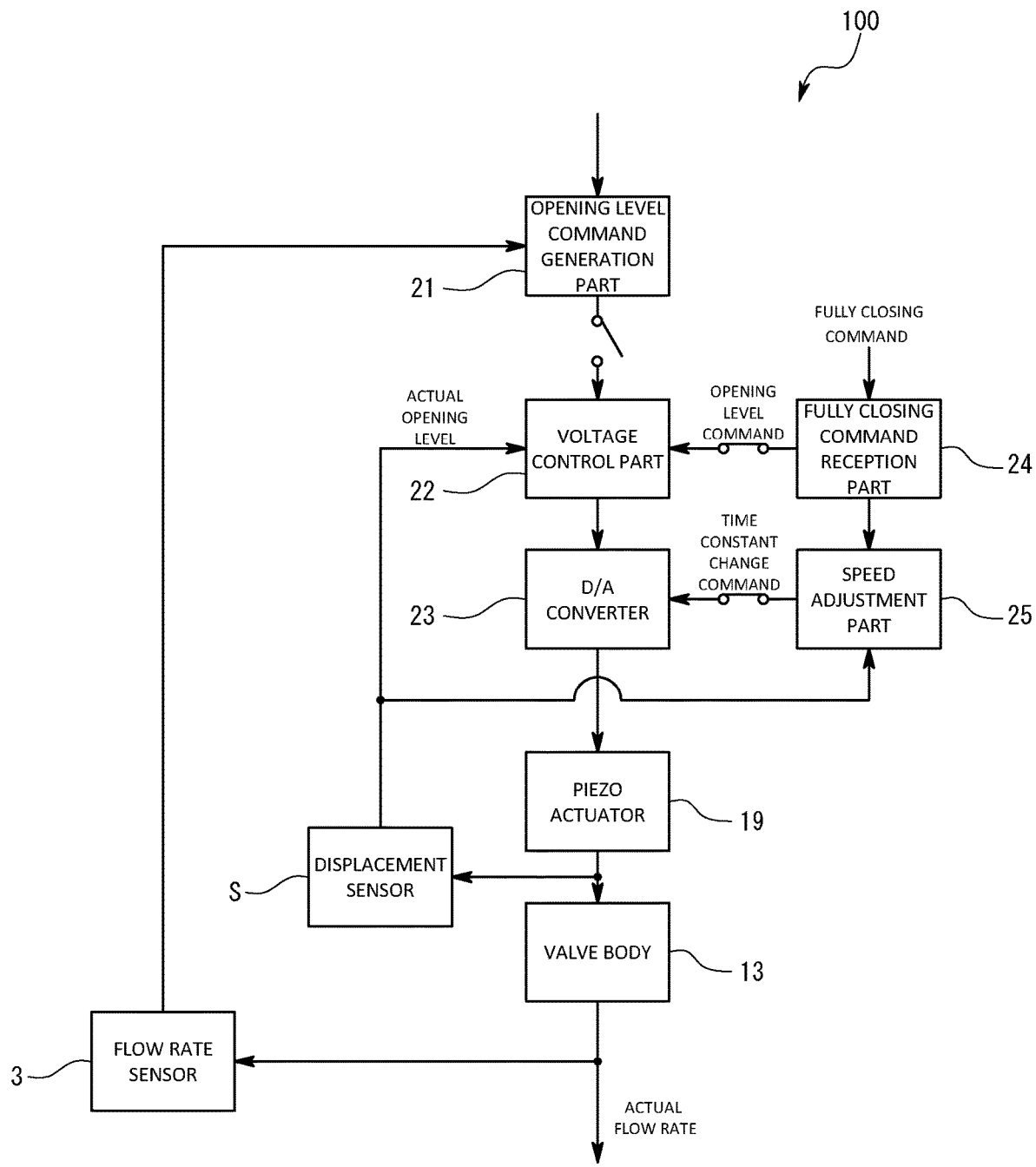
FIG. 4 is a functional block diagram illustrating a state where the fluid control device in the first embodiment performs fully closing operation.

The control mechanism 2 is one whose functions are implemented by a so-called computer including a CPU, a memory, A/D and D/A converters 23, input and output means, and the like. More specifically, as illustrated in FIGS. 3 and 4, the control mechanism 2 is configured to function as at least an opening level command generation part 21, voltage control part 22, fully closing command reception part 24, and speed adjustment part 25 as a result of the execution of a control program stored in the memory and the collaboration of various devices. Note that the first embodiment is adapted to have a different operation mode between when controlling the flow rate as illustrated in FIG. 3 and when receiving a fully closing command as illustrated in FIG. 4.

The respective parts will be described in detail.

In the flow rate control mode illustrated in FIG. 3, the opening level command generation part 21 is one adapted to generate an opening level command on the basis of the deviation between a setting flow rate, which is a target value set by a user, and an actual flow rate measured by the flow rate sensor 3 so as to decrease the deviation, and output the value of the opening level command to the voltage control part 22. That is, the opening level command generation part 21 utilizes flow rate feedback to calculate an opening level necessary to achieve the setting flow rate, and outputs the opening level as the opening level command. Note that when the fully closing command is received as illustrated in FIG. 4, the opening level command generation part 21 does not output to an opening level command to the voltage control part 22.

The voltage control part 22 is one adapted to output a digital voltage command signal for controlling voltage to be applied to the piezo actuator 19. In the flow rate control mode illustrated in FIG. 3, the voltage control part 22 outputs the voltage command signal on the basis of the deviation between the inputted opening level command and an actual opening level detected by the displacement sensor S so as to decrease the deviation. That is, the voltage control part 22 utilizes opening level feedback to control the movement of the valve body 13.

Also, when the fully closing command is received as illustrated in FIG. 4, the voltage control part 22 outputs the voltage command signal having a value of zero so as to discharge voltage applied to the piezo actuator 19 until just before the valve body 13 contacts with the valve seat surface 11. After that, when the valve body 13 contacts with the valve seat surface 11, the voltage control part 22 outputs the voltage command signal so that negative voltage is applied to the piezo actuator 19.

The D/A converter 23 outputs analog voltage corresponding to the digital voltage command signal outputted from the voltage control part 22 and applies the voltage to the piezo actuator 19. The D/A converter 23 is characterized by, for example, exhibiting a first-order lag response to a step input, and being able to change the time constant of the response as a setting variable.

The fully closing command reception part 24 is one adapted to receive from a user the fully closing command for finishing the flow rate control mode and perform the fully closing mode adapted to fully close the fluid control valve 1 to prevent the fluid from flowing toward the downstream side. When receiving the fully closing command, the fully closing command reception part 24 operates so that the flow rate feedback is turned off, and only the opening level feedback based on the output of the displacement sensor S is utilized to achieve the fully The speed adjustment part 25 is one that operates when the fully closing command is received as illustrated in FIG. 4, and when the valve body 13 is brought close to the valve seat surface 11 in order to fully close the fluid control valve 1 and the distance between the valve seat surface 11 and the valve body 13 reaches a predetermined distance, more reduces the moving speed of the valve body 13 than before reaching the predetermined distance. In the first embodiment, the speed adjustment part 25 changes the time constant as the setting variable for the D/A converter 23, and thereby reduces the moving speed of the valve body 13 just before the full closure. In other words, the speed adjustment part 25 reduces the response speed of the D/A converter 23 just before the full closure to reduce the discharge speed of the piezo actuator 19, and thereby brings the valve body 13 into contact with the valve seat surface 11 in such a way as to prevent an impact load having a predetermined value or more from being put on the valve seat surface 11. Note that in the following description, a position where the distance between the valve seat surface 11 and the valve body 13 reaches the predetermined distance is also referred to as a speed reduction start position.

Figure 5:
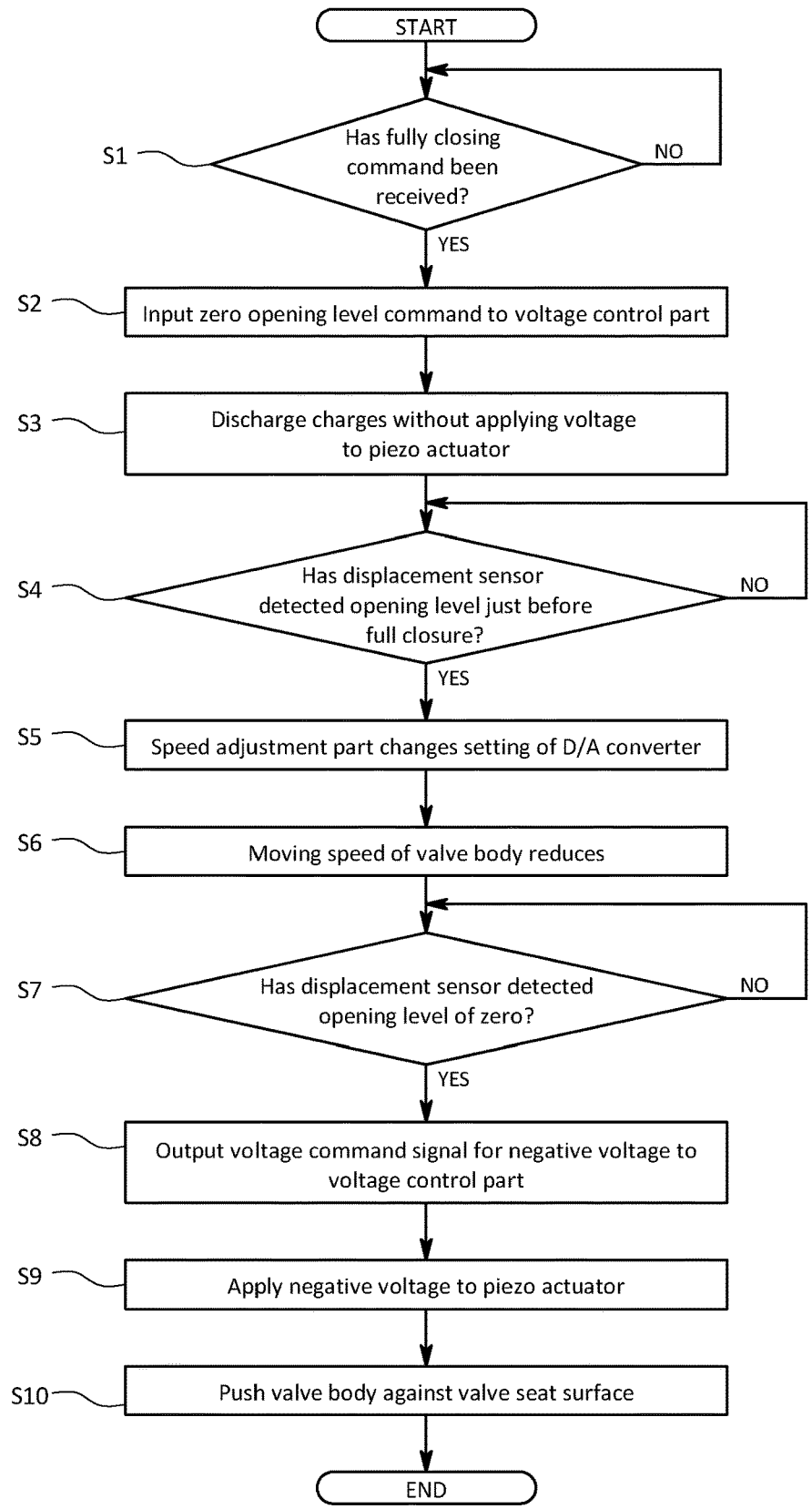
FIG. 5 is a flowchart of the fully closing operation by the fluid control device in the first embodiment.

The control operation of the mass flow controller 100 configured as described above during the fully closing operation will be described with reference to a flowchart of FIG. 5 and a schematic diagram illustrating the movement of the valve body 13 during the fully closing operation illustrated in FIGS. 6(*a*)-6(*c*).

As illustrated in FIG. 6(*a*), when receiving the fully closing command from a user in a state where the flow rate control is performed with the valve body 13 separated from the valve seat surface 11 (Step S1), the fully closing command reception part 24 inputs a value of zero to the voltage control part 22 as the opening level command (Step S2). As a result, the voltage control part 22 outputs the voltage command signal so as not to apply voltage to the piezo actuator 19, and the discharge of charges accumulated in the piezo actuator 19 is started (Step S3).

Figures 6A, 6B, 6C:
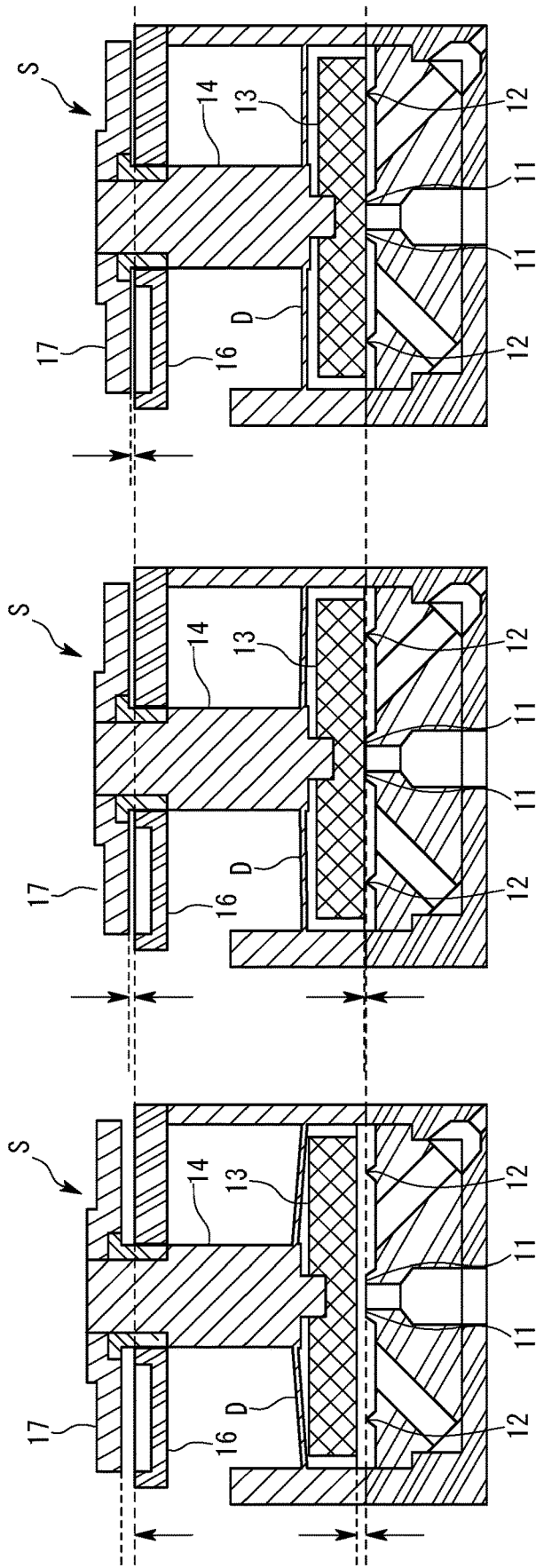
FIGS. 6(a)-6(c) are schematic diagrams illustrating the fully closing operation by the fluid control device in the first embodiment.

When the charges are discharged, the piezo actuator 19 contracts, and thereby the displacement inverting mechanism 18 pushes the valve body 13 downward against the valve seat surface 11. While the valve body 13 is coming close to the valve seat surface 11, the distance between the valve body 13 and the valve seat surface 11 is monitored by the displacement sensor S, and the speed adjustment part 25 keeps determining whether or not the predetermined distance just before the full closure as illustrated in FIG. 6(b) is reached (Step S4). The predetermined distance may be appropriately set, and here set to, for example, an opening level at the beginning of opening when the flow rate sensor 3 starts to detect the flow rate. At this point of time, the speed adjustment part 25 switches to a time constant large than the time constant used in the normal flow rate control mode by the D/A converter 23 to reduce the response of the D/A converter 23 (Step S5). As a result, the moving speed of the valve body 13 reduces, and as compared with the beginning of the fully closing operation from Steps S1 to S4, the valve body 13 slowly moves (Step S6).

The monitoring of the opening level by the displacement sensor S still continues, and the voltage control part 22 determines whether or not the valve body 13 has fully contacted with the valve seat surface 11 as illustrated in FIG. 6(c) (Step S7), and at the point of the contact, outputs the voltage command signal for negative voltage (Step S8). As a result, the negative voltage is applied to the piezo actuator 19 (Step S9), and the valve body 13 is further pushed against the valve seat surface 11 (Step S10). Note that the amount of pushing the valve body 13 is limited within, for example, an elastic deformation range, and the valve body 13 is adapted to be restored to an original shape when the fully closed state is released. Alternatively, the speed adjustment part 25 may be adapted to restore the setting of the D/A converter 23 to the original one, for example, at the point when the displacement sensor S detects that the valve body 13 is in contact with the valve seat surface 11 or when the valve body 13 is pushed against the valve seat surface 11.

As described above, the mass flow controller 100 of the first embodiment can reduce the moving speed of the valve body 13 at the point when during the fully closing operation, the valve body 13 comes close to the valve seat surface 11 and reaches the position separated from the valve seat surface 11 by the predetermined distance just before the full closure. For this reason, the valve body 13 can be prevented from violently hitting against the valve seat surface 11 to damage the valve body 13 or the valve seat surface 11 due to an impact load.

Accordingly, as in the first embodiment, even in the structure adapted be sealed with the strong pressing force in the state where no voltage is applied to the piezo actuator 19 in such a way that the self-weight of the upper side than the valve body 13 allows the valve body 13 to close the valve seat surface 11, the damage of the valve body 13 or the valve seat surface 11 is unlikely to develop due to secular change by repetitive operation.

Also, since the valve body 13 is adapted to be gradually brought into contact with the valve seat surface 11 so as to prevent damage, and then be further pushed by applying the negative voltage to the piezo actuator 19, sealing performance can be further enhanced.

From the above, the mass flow controller 100 that is highly durable and long-lived while achieving high sealing performance at the time of full closure to prevent even minor leakage can be provided. Also, the control method as described above allows a long life to be achieved, and therefore, for example, it is not necessary to make the mechanical parallelism of the valve body 13 higher than the current one.

Next, a fluid control device according to a second embodiment will be described with reference to FIGS. 7 and 8. Note that members corresponding to those described in the first embodiment are denoted by the same symbols.

The first embodiment is configured such that the speed adjustment part 25 reduces the moving speed of the valve body 13 just before the full closure by changing the setting of the D/A converter 23; however, the second embodiment is configured to keep the setting of a D/A converter 23 always constant. That is, the second embodiment is different from the first embodiment in that a fully closing command is inputted in the form of keeping a setting flow rate having a value of zero for a predetermined period and in the configuration of a speed adjustment part 25.

That is, the speed adjustment part 25 in the second embodiment is configured to reduce the moving speed of a valve body 13 just before full closure by shaping the setting flow rate set by a user.

Figure 7:
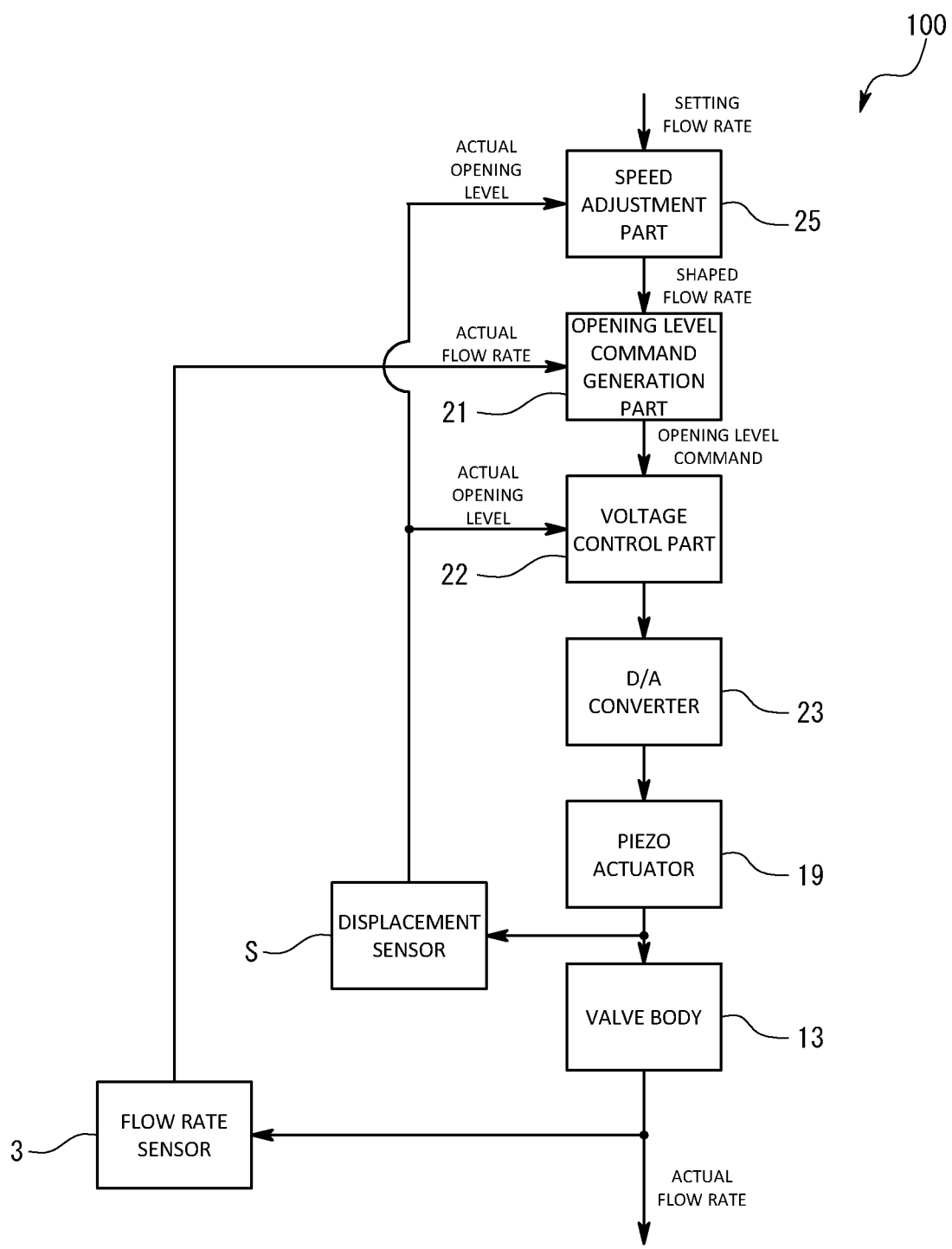
FIG. 7 is a functional block diagram illustrating a state where a fluid control device according to a second embodiment performs fully closing operation.

More specifically, as illustrated in a functional block diagram of FIG. 7, the speed adjustment part 25 is configured to be inputted with the setting flow rate and the distance between the valve body 13 and a valve seat surface 11 detected by a displacement sensor S, and output a shaped flow rate shaped on the basis of the setting flow rate to an opening level command generation part 21.

Figure 8:
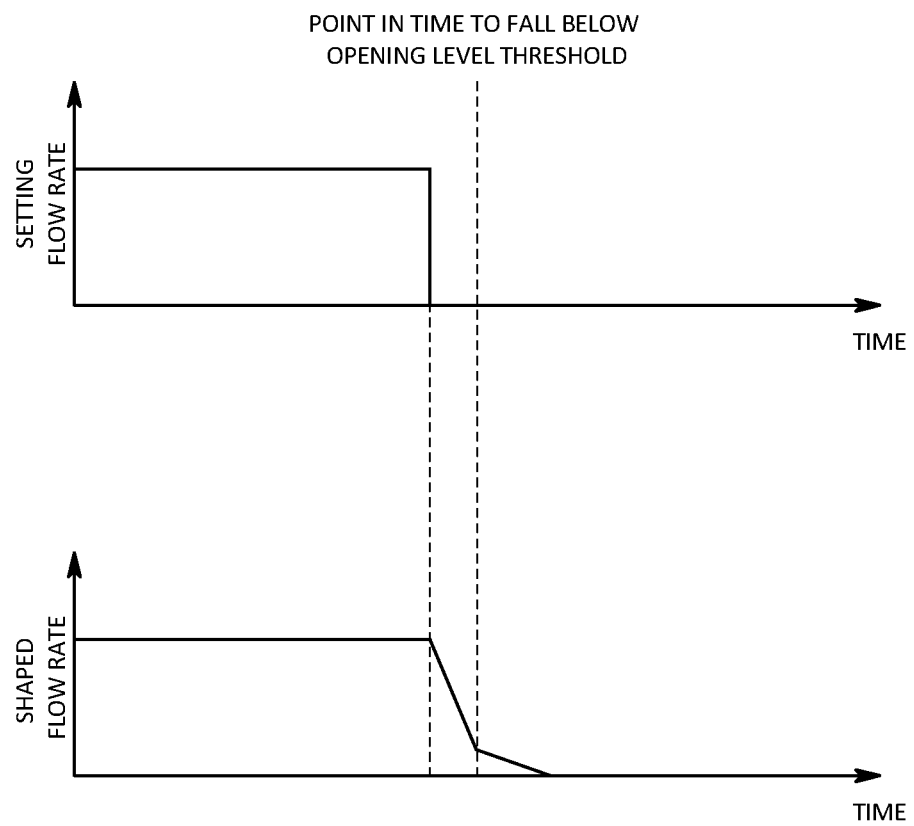
FIG. 8 is a schematic graph illustrating an image of a shaped flow rate outputted by a speed adjustment part in the second embodiment.

A description is given while taking as an example a case where as illustrated in a graph of FIG. 8, a stepwise setting flow rate adapted to switch from a state where a predetermined flow rate value is kept to a state where a flow rate value of zero is kept is inputted to the speed adjustment part 25, and the fully closing command is issued. When detecting a point of discontinuity where a certain flow rate value is switched to zero, the speed adjustment part 25 outputs the shaped flow rate such that the flow rate value decreases toward zero at a first slope until an opening level detected by the displacement sensor S reaches a predetermined opening level threshold value. As a result, an actual flow rate decreases by the actions of flow rate feedback and opening level feedback, and the opening level reduces. For example, when the opening level detected by the displacement sensor S reaches the opening level threshold value corresponding to an opening level just before full closure, the speed adjustment parts 25 outputs the shaped flow rate such that a flow rate value decreases toward zero at a second slope. Note that the absolute value of the second slope is set to be smaller than the absolute value of the first slope.

Even in such a configuration, the position of the valve body 13 in the course of fully closing operation is controlled in accordance with the shaped flow rate illustrated in FIG. 8, and therefore while the valve body 13 is being separated from the valve seat surface 11 farther than a predetermined distance, the valve body 13 can be brought close at high speed, whereas in a region just before the full closure, the moving speed of the valve body 13 can be reduced to reduce an impact force generated between the valve body 13 and the valve seat surface 11.

Accordingly, during the fully closing operation, damage can be prevented from occurring between the valve body 13 and the valve seat surface 11, and high sealing performance can be kept over a long period of time.

Next, a fluid control device according to a third embodiment will be described with reference to FIG. 9. Note that members corresponding to those described in the first embodiment are denoted by the same symbols.

Figure 9:
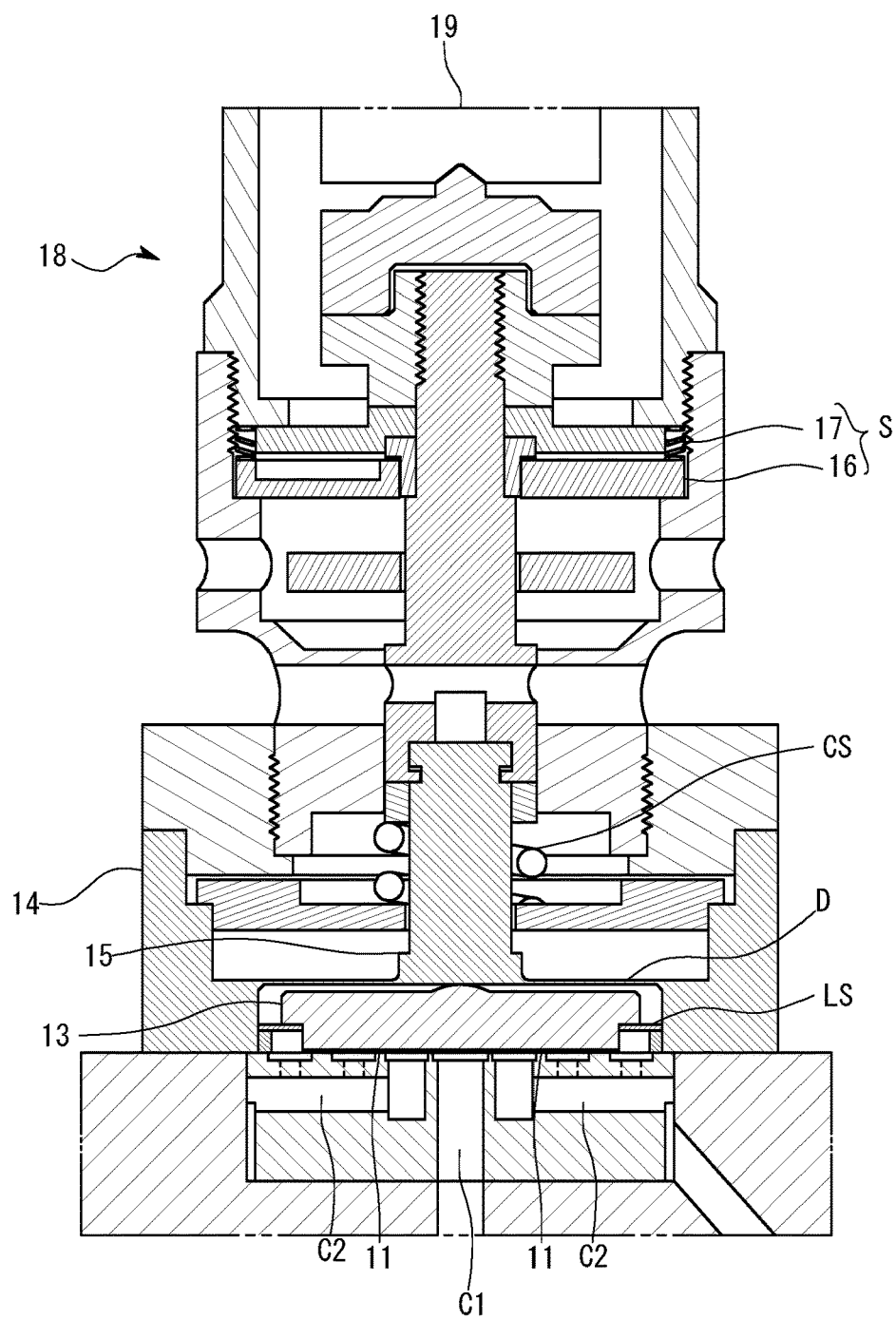
FIG. 9 is a schematic partially enlarged view of a fluid control valve constituting a fluid control device according to a third embodiment.

A mass flow controller 100 in the third embodiment is such that as illustrated in FIG. 9, the type of a fluid control valve 1 is not a normally closed type as in the first embodiment, but a normally opened type that when no voltage is applied to an actuator, is in an opened state where a gap is formed between a valve seat surface 11 and a valve body 13. Note that the configuration of a software part is substantially the same as that illustrated in FIGS. 3 and 4.

Specifically, the fluid control valve 1 includes: a coil spring CS that when no voltage is applied to the piezo actuator 19, raises the piezo actuator 19 upward in a direction to open between the valve body 13 and the valve seat surface 11; and a leaf spring LS that exerts a biasing force in a direction to separate the valve body 13 from the valve seat surface 11. Also, the valve body 13 is configured to be pushed downward against the valve seat surface 11 and consequently reduce the separation distance between them by applying positive voltage to the piezo actuator 19 to extend it.

In the third embodiment, in the transition to a fully closed state of such a fluid control valve 1 of a normally opened type, at the point when the distance between the valve body 13 and the valve seat surface 11 reaches a predetermined distance, the moving speed of the valve body 13 is reduced. That is, when a fully closing command is inputted to the mass flow controller 100, at the point when the valve body 13 reaches a speed reduction start position near the valve seat surface 11, a speed adjustment part 25 changes the time constant of a D/A converter 23 to reduce response speed. In this way, at the time of full closure, the valve body 13 is prevented from being applied with an impact load from the valve seat surface 11 and consequently damaged Operation at the time of the full closure in the third embodiment configured as described above will be described on the basis of changes in position signal outputted from a displacement sensor S and in voltage signal outputted from the D/A converter 23 to the piezo actuator 19 with reference to FIGS. 10(a) and 10(b).

When the fully closing command or a setting flow rate indicating a zero flow rate is inputted to the mass flow controller 100, on the basis of flow rate feedback and feedback about the position of the valve body 13, voltage to be applied to the piezo actuator 19 is applied in such a way as to be increased at a predetermined increase rate so that the valve body 13 comes close to the valve seat surface 11 as illustrated in FIG. 10(a).

Then, when detecting on the basis of the position signal from the displacement sensor S that the valve body 13 reaches the speed reduction start position near the valve seat surface 11, the speed adjustment part 25 changes the time constant of the D/A converter 23 to reduce the response speed to a command value. As a result, after passing the speed reduction start position, the increase rate of the voltage applied to the piezo actuator 19 reduces and thereby the moving speed of the valve body 13 also reduces.

After the valve body 13 has reached a fully closed position, voltage necessary to keep the fully closed state is continuously held.

In addition, in the case of the fluid control valve 1 of a normally closed type as in the first embodiment, as illustrated in FIG. 10(b), the voltage signal to be outputted reduces as the valve body 13 comes closer to the valve seat surface 11, and finally, in the fully closed state, the valve body 13 is brought into a state of being pushed against the valve seat surface 11 by applying no voltage or negative voltage to the piezo actuator 19.

Even in the case of the fluid control valve 1 of a normally open type as in the third embodiment, as in the first embodiment, the valve body 13 can be prevented from hitting against the valve seat surface 11 and thereby being damaged to reduce sealing performance.

In addition, in order to further enhance the sealing performance in the fully closed state of the fluid control valve 1 of a normally opened type as in the third embodiment, voltage may be increased from the full-closure maintainable voltage to bring the valve body 13 into a state of being pushed against the valve seat surface 11.

Next, a fluid control device according to a fourth embodiment of the present invention will be described with reference to FIGS. 11 and 12. The fourth embodiment is configured to be capable of sufficiently reduce the moving speed of a valve body 13 just before full closure even when the characteristics of an actuator, various elastic members, and the like change due to secular change, and for example, a factory default value indicated by a position signal outputted from a displacement sensor S at the time of full closure is different from a value indicated by a position signal outputted at actual full closure.

Figure 11:
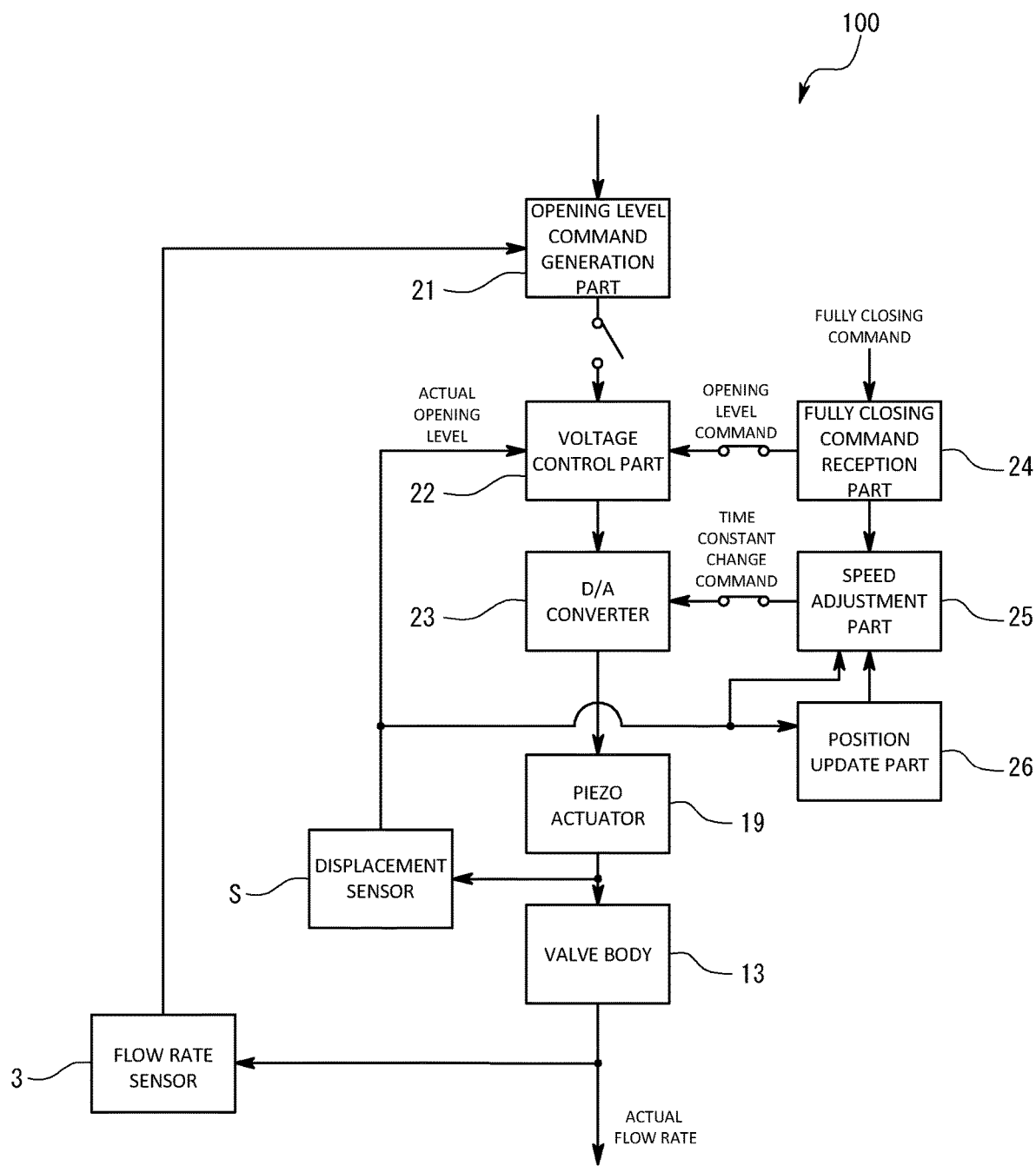
FIG. 11 is a functional block diagram illustrating the configuration of a fluid control device according to a fourth embodiment.

Specifically, as illustrated in FIG. 11, the fourth embodiment further includes a position update part 26 adapted to update a speed reduction start position where the timing when a speed adjustment part 25 outputs a time constant change command is determined.

The position update part 26 stores the count value of a position signal from the displacement sensor S at a fully closed position at a normal time such as at the time of factory shipment and the count value of a position sensor from the displacement sensor at the speed reduction start position that is a predetermined position separated from the fully closed position by a predetermined distance. Alternatively, the position update part 26 may store the difference in count value between the fully closed position and the speed reduction start position.

Further, the position update part 26 acquires a count value indicating a fully closed state where the position signal outputted from the displacement sensor S indicates an almost constant value in a state where a fully closing command is inputted, and as a new speed reduction start position, sets a count value different from that count value by a predetermined value in the speed adjustment part 25.

Figure 12:
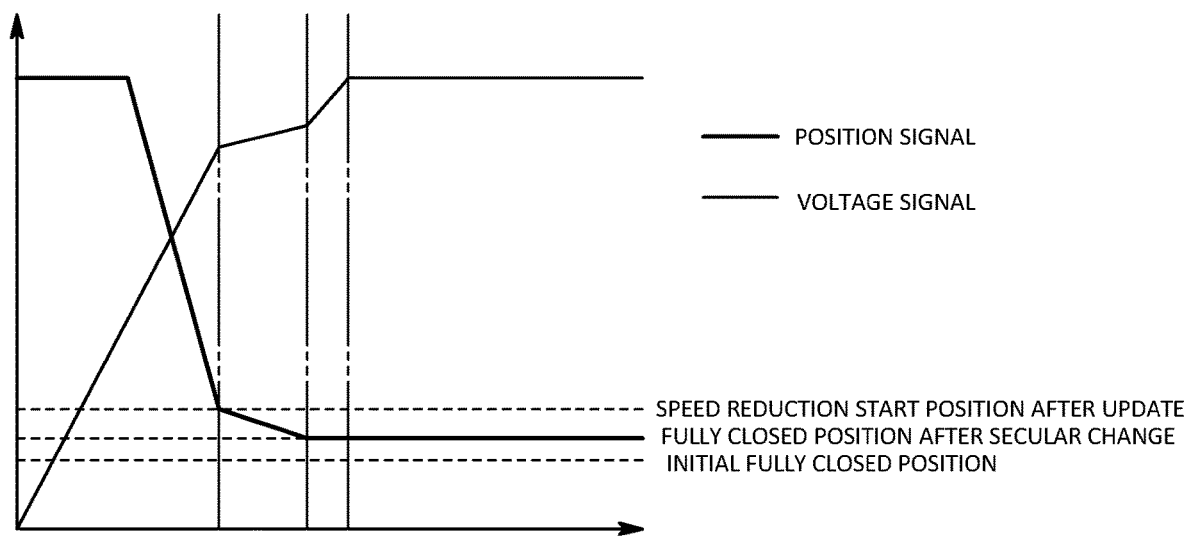
FIG. 12 is a schematic graph illustrating fully closing operation of the fluid control device according to the fourth embodiment.

In the mass flow controller 100 of the fourth embodiment configured as described above, even when the relationship between a value indicated by the position signal from the displacement sensor S and the fully closed position changes due to secular change as illustrated in FIG. 12, the position update part 26 can set a new updated speed reduction start position in the speed adjustment part 25 on the basis of the value of the position signal from the displacement sensor S indicating the fully closed position after the secular change.

Accordingly, even when the secular change occurs, it is possible to, at the time of the full closure, reduce the moving speed of the valve body 13 at the position separated from the fully closed position by the predetermined distance, and prevent the valve body 13 from hitting against a valve seat surface 11 and consequently being damaged.

Other embodiments will be described.

In each of the embodiments, the fluid control device is described while taking a mass flow controller as an example; however, the fluid control device may be, for example, a pressure control device adapted to keep setting pressure by feeding pressure back. Also, the fluid control device may be one configured to make only a fluid control vale and a control mechanism perform only fully closing operation without performing flow rate control or pressure control.

Each of the embodiments is configured to, in the flow rate control mode, form a flow rate feedback loop and an opening level feedback loop, but may be configured to, for example, in the flow rate control mode, feed back only the flow rate and during the fully closing operation, feed back only the opening level.

Timing to reduce the moving speed of the valve body is preferably just before the full closure in terms of responsiveness, but may be set to be other than the timing described in each of the embodiments. For example, the speed adjustment part may be configured to reduce the moving speed of the valve body when an opening level half an opening level at the beginning of full closure is reached. In short, it is only necessary to reduce the moving speed of the valve body to the extent that at the point when the valve body contacts with the valve seat surface, no damage occurs or damage occurs only to an acceptable extent.

If the fluid control device has no displacement sensor and the opening level cannot be directly measured, the fluid control device may be configured to, for example, estimate a current opening level from voltage applied to the actuator, and reduce the moving speed of the valve body at the point when the opening level reaches a level just before full closure. In addition, as the actuator, without limitation to the piezo actuator, another device such as a solenoid may be used.

The first embodiment is configured to switch the setting of the D/A converter at the point when the distance between the valve body and the valve seat surface reaches the predetermined distance; however, in order to make it possible to reduce impact on the control system due to the switching and achieve more stable control, it is only necessary that the setting is adapted to be continuously changed during the fully closing operation. In this case, even without detecting the position of the valve body by a displacement sensor, the speed adjustment part can also be operated on the basis of the setting flow rate or the opening level command. Also, the setting variable to be changed is not limited to the time constant, but only has to be one allowing the moving speed of the valve body to be changed.

In the second embodiment, the speed adjustment part is configured to apply linear interpolation to the point of discontinuity of the setting flow rate, but may be configured to reduce the moving speed of the valve body at least just before the full closure using various interpolation methods such as S-shaped interpolation.

A configuration in which the valve seat block is not provided with an aligner but is formed only with the valve seat surface is also possible.

Besides, various combinations and modifications of the embodiments may be made without departing from the scope of the present invention.

LIST OF REFERENCE CHARACTERS

100: Mass flow controller
1: Fluid control valve
10: Valve seat block
11: Valve seat surface
12: Aligner
13: Valve body
14: Housing
15: Shaft
16: Sensor plate
17: Target
18: Displacement inverting mechanism
19: Piezo actuator
2: Control mechanism
21: Opening level command generation part
22: Voltage control part
23: D/A converter
24: Fully closing command reception part
25: Speed adjustment part
3: Flow rate sensor
31: First pressure sensor
32: Second pressure sensor
33: Laminar flow element

The invention claimed is:

1. A fluid control device comprising:
a fluid control valve provided in a flow path through which fluid flows: and
a control mechanism comprising a processor a memory, and a D/A converter, and configured to control the fluid control valve, wherein
the fluid control valve comprises:
a valve seat surface;
a valve body adapted to contact with and separate from the valve seat surface;
an actuator adapted to drive the valve body; and
a displacement sensor adapted to detect a distance between the valve seat surface and the valve body, and
the control mechanism is configured to execute functions of:
D/A conversion implemented by the D/A converter to output analog voltage corresponding to a digital voltage command signal; and
speed adjustment to, when the valve body is brought close to the valve seat surface while closing the fluid control valve, and the distance detected by the displacement sensor is equal to or less than a predetermined distance, change a setting coefficient for the D/A converter so as to reduce a moving speed of the valve body more than when the distance detected by the displacement sensor is larger than the predetermined distance.

2. The fluid control device according to claim 1, wherein the control mechanism further executes functions of speed adjustment to, when the distance detected by the displacement sensor is equal to or less than the predetermined distance, reduce the moving speed of the valve body more than when the distance detected by the displacement sensor is larger than the predetermined distance.

3. The fluid control device according to claim 2, wherein the control mechanism further executes functions of:
voltage control to output the digital voltage command signal for controlling voltage to be applied to the actuator, wherein
when the distance detected by the displacement sensor reaches zero, the control mechanism further executes functions of voltage control to output the digital voltage command signal so as to further move the valve body toward a valve seat surface side.

4. The fluid control device according to claim 1, wherein the actuator is a piezo actuator, and
when the distance detected by the displacement sensor is equal to or less than the predetermined distance, the control mechanism executes functions of speed adjustment to change the setting coefficient for the D/A converter so as to more reduce a discharge speed of the piezo actuator than when the distance detected by the displacement sensor is larger than the predetermined distance.

5. The fluid control device according to claim 4, configured such that when positive voltage is applied to the piezo actuator, the valve body moves in a direction to separate from the valve seat surface, and in a state where no voltage is applied to the piezo actuator, is in contact with the valve seat surface, wherein when the distance detected by the displacement sensor reaches zero, the control mechanism executes functions of voltage control to output the digital voltage command signal so as to apply negative voltage to the piezo actuator.

6. The fluid control device according to claim 1, wherein the valve seat surface is formed surrounding an inflow opening through which the fluid flows in, and the valve body comprises:

a closing surface adapted to contact with the valve seat surface to close the inflow opening; and a peripheral surface formed flush with an outer side of the closing surface, the fluid control device further comprising an aligner of which at least a part is formed in a same plane as the valve seat surface on the outer side of the closing surface.

7. The fluid control device according to claim 1, wherein the actuator is a piezo actuator, and when the distance detected by the displacement sensor is equal to or less than the predetermined distance, the control mechanism changes the setting coefficient for the D/A converter so as to reduce a voltage increase rate of the piezo actuator more than when the distance detected by the displacement sensor is larger than the predetermined distance.

8. The fluid control device according to claim 1, wherein the control mechanism executes functions of speed adjustment to store a speed reduction start position of starting to reduce the moving speed of the valve body in the memory, and reduces the moving speed of the valve body when a position detected by the displacement sensor reaches the speed reduction start position, the control mechanism further executes functions of position update to update the speed reduction start position on a basis of a position signal outputted from the displacement sensor in a fully closed state.

9. A non-volatile recording medium recorded with control program used for a fluid control device comprising: a fluid control valve provided in a flow path through which fluid flows: and a control mechanism comprising a processor and a memory and configured to control the fluid control valve, wherein the fluid control valve includes: a valve seat surface; a valve body adapted to contact with and separate from the valve seat surface; an actuator adapted to drive the valve body; and a displacement sensor adapted to detect a distance between the valve seat surface and the valve body, and the control mechanism comprising a D/A converter executes functions of D/A conversion to output analog voltage corresponding to a digital voltage command signal, the control program instructing the control mechanism to execute functions of speed adjustment to, when the valve body is brought close to the valve seat surface while closing the fluid control valve, and the distance detected by the displacement sensor is equal to or less than a predetermined distance, change a setting coefficient for the D/A converter so as to reduce a moving speed of the valve body more than when the distance detected by the displacement sensor is larger than the predetermined distance.

10. A control method for a fluid control device comprising: a fluid control valve provided in a flow path through which fluid flows: and a control mechanism comprising a processor, a memory, and a D/A converter, and configured to control the fluid control valve, wherein the fluid control valve comprises: a valve seat surface; a valve body adapted to contact with and separate from the valve seat surface; an actuator adapted to drive the valve body; and a displacement sensor adapted to detect a distance between the valve seat surface and the valve body, and the control mechanism executes functions of D/A conversion to output analog voltage corresponding to a digital voltage command signal, the control method comprising:

outputting the analog voltage corresponding to the digital voltage command signal; and when the valve body is brought close to the valve seat surface while closing the fluid control valve, and the distance detected by the displacement sensor is equal to or less than a predetermined distance, changing a setting coefficient for the D/A converter so as to reduce a moving speed of the valve body more than when the distance detected by the displacement sensor is larger than the predetermined distance.

* * * * *

UNITED STATES PATENT AND TRADEMARK OFFICE
CERTIFICATE OF CORRECTION

PATENT NO. : 10,969,019 B2  
APPLICATION NO. : 16/001890  
DATED : April 6, 2021  
INVENTOR(S) : Tadahiro Yasuda et al.

Page 1 of 1

It is certified that error appears in the above-identified patent and that said Letters Patent is hereby corrected as shown below:

In the Claims

In Column 14, Line 13, Claim 1 insert --","-- after 'processor'.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*